(12) United States Patent
Sakakibara

(10) Patent No.: US 8,147,634 B2
(45) Date of Patent: Apr. 3, 2012

(54) HONEYCOMB STRUCTURE AND METHOD FOR MANUFACTURING HONEYCOMB STRUCTURE

(75) Inventor: Kazuaki Sakakibara, Ibi-gun (JP)

(73) Assignee: Ibiden Co., Ltd., Ogaki-shi (JP)

( * ) Notice: Subject to any disclaimer, the term of this patent is extended or adjusted under 35 U.S.C. 154(b) by 0 days.

(21) Appl. No.: 12/141,584

(22) Filed: Jun. 18, 2008

(65) Prior Publication Data
US 2008/0318001 A1 Dec. 25, 2008

(30) Foreign Application Priority Data

Jun. 21, 2007 (WO) .................. PCT/JP2007/062505

(51) Int. Cl.
*C04B 33/34* (2006.01)
*B32B 3/12* (2006.01)

(52) U.S. Cl. .................................... 156/89.22; 428/116

(58) Field of Classification Search ................ 156/89.22
See application file for complete search history.

(56) References Cited

U.S. PATENT DOCUMENTS

| | | | |
|---|---|---|---|
| 5,914,187 A | 6/1999 | Naruse et al. | |
| 6,669,751 B1 | 12/2003 | Ohno et al. | |
| 6,984,253 B2* | 1/2006 | Ichikawa et al. | ................ 55/484 |
| 7,112,233 B2 | 9/2006 | Ohno et al. | |
| 7,284,980 B2 | 10/2007 | Saijo et al. | |
| 7,309,370 B2 | 12/2007 | Kudo et al. | |
| 7,332,014 B2 | 2/2008 | Ono et al. | |
| 7,341,614 B2 | 3/2008 | Hayashi et al. | |
| 7,348,049 B2 | 3/2008 | Yoshida | |
| 7,387,829 B2 | 6/2008 | Ohno et al. | |
| 7,393,376 B2 | 7/2008 | Taoka et al. | |
| 7,396,586 B2 | 7/2008 | Ohno et al. | |
| 7,427,308 B2 | 9/2008 | Taoka et al. | |
| 7,427,309 B2 | 9/2008 | Ohno et al. | |
| 7,438,967 B2 | 10/2008 | Fujita | |
| 7,449,427 B2 | 11/2008 | Ohno et al. | |
| 7,462,216 B2 | 12/2008 | Kunieda et al. | |
| 7,473,465 B2 | 1/2009 | Ohno et al. | |
| 2002/0050669 A1* | 5/2002 | Obata et al. | ................ 264/630 |
| 2004/0108056 A1* | 6/2004 | Fujita et al. | ................ 156/276 |
| 2004/0161596 A1 | 8/2004 | Taoka et al. | |
| 2005/0102984 A1 | 5/2005 | Bardon et al. | |
| 2005/0109023 A1 | 5/2005 | Kudo et al. | |
| 2005/0153099 A1 | 7/2005 | Yamada | |
| 2005/0169819 A1 | 8/2005 | Shibata | |
| 2005/0175514 A1 | 8/2005 | Ohno | |

(Continued)

FOREIGN PATENT DOCUMENTS

EP 1277717 1/2003

(Continued)

*Primary Examiner* — Philip Tucker
*Assistant Examiner* — Alex Efta
(74) *Attorney, Agent, or Firm* — Ditthavong Mori & Steiner, P.C.

(57) ABSTRACT

A honeycomb structure includes a ceramic block and a sealing material layer. The ceramic block includes a plurality of honeycomb fired bodies each having a large number of cells longitudinally disposed substantially in parallel with one another with a cell wall between the cells, an adhesive layer for bonding side faces of the honeycomb fired bodies, and a cavity-holding member placed between the side faces of the honeycomb fired bodies. The sealing material layer is formed on a peripheral face of the ceramic block. The cavity-holding member includes a nonflammable material having Young's modulus of at least about 0.001 GPa and at most about 0.07 GPa.

22 Claims, 6 Drawing Sheets

U.S. PATENT DOCUMENTS

| | | |
|---|---|---|
| 2005/0180898 A1 | 8/2005 | Yamada |
| 2005/0247038 A1 | 11/2005 | Takahashi |
| 2005/0272602 A1 | 12/2005 | Ninomiya |
| 2006/0029898 A1 | 2/2006 | Saijo et al. |
| 2006/0043652 A1 | 3/2006 | Saijo et al. |
| 2006/0051556 A1 | 3/2006 | Ohno et al. |
| 2006/0073970 A1 | 4/2006 | Yamada |
| 2006/0108347 A1 | 5/2006 | Koyama et al. |
| 2006/0118546 A1 | 6/2006 | Saijo |
| 2006/0121240 A1* | 6/2006 | Hirai et al. ............... 428/116 |
| 2006/0150597 A1* | 7/2006 | Masukawa et al. ........... 55/523 |
| 2006/0166820 A1 | 7/2006 | Ogyu et al. |
| 2006/0210765 A1 | 9/2006 | Ohno et al. |
| 2006/0216466 A1 | 9/2006 | Yoshida |
| 2006/0216467 A1 | 9/2006 | Yoshida |
| 2006/0222812 A1 | 10/2006 | Koyama et al. |
| 2006/0225390 A1 | 10/2006 | Yoshida |
| 2006/0230732 A1 | 10/2006 | Kunieda |
| 2006/0245465 A1 | 11/2006 | Saijo et al. |
| 2006/0269722 A1 | 11/2006 | Yamada |
| 2007/0020155 A1 | 1/2007 | Ohno et al. |
| 2007/0028575 A1 | 2/2007 | Ohno et al. |
| 2007/0044444 A1 | 3/2007 | Oshimi |
| 2007/0068128 A1 | 3/2007 | Oshimi et al. |
| 2007/0082174 A1* | 4/2007 | Masukawa et al. .......... 428/116 |
| 2007/0085233 A1 | 4/2007 | Yamada |
| 2007/0116908 A1 | 5/2007 | Ohno et al. |
| 2007/0126160 A1 | 6/2007 | Takahashi |
| 2007/0128405 A1 | 6/2007 | Sakaguchi et al. |
| 2007/0130897 A1 | 6/2007 | Sakaguchi et al. |
| 2007/0144561 A1 | 6/2007 | Saijo et al. |
| 2007/0148403 A1 | 6/2007 | Yamamura et al. |
| 2007/0152382 A1 | 7/2007 | Yamada et al. |
| 2007/0169453 A1 | 7/2007 | Hayakawa |
| 2007/0175060 A1 | 8/2007 | Idei et al. |
| 2007/0178275 A1 | 8/2007 | Takahashi |
| 2007/0187651 A1 | 8/2007 | Naruse et al. |
| 2007/0190350 A1 | 8/2007 | Ohno et al. |
| 2007/0196620 A1 | 8/2007 | Ohno et al. |
| 2007/0199205 A1 | 8/2007 | Hoshino et al. |
| 2007/0199643 A1 | 8/2007 | Kawai et al. |
| 2007/0202455 A1 | 8/2007 | Saijo et al. |
| 2007/0204580 A1 | 9/2007 | Kunieda |
| 2007/0212517 A1* | 9/2007 | Ohno et al. ................ 428/116 |
| 2007/0235895 A1 | 10/2007 | Yamamura et al. |
| 2007/0243283 A1 | 10/2007 | Yamamura et al. |
| 2007/0262497 A1 | 11/2007 | Yamamura et al. |
| 2007/0262498 A1 | 11/2007 | Saijo et al. |
| 2007/0277655 A1 | 12/2007 | Kawai et al. |
| 2007/0293392 A1 | 12/2007 | Ohno et al. |
| 2008/0006971 A1 | 1/2008 | Kawai et al. |
| 2008/0067725 A1 | 3/2008 | Naruse et al. |
| 2008/0084010 A1 | 4/2008 | Naruse et al. |
| 2008/0088072 A1 | 4/2008 | Kobayashi |
| 2008/0106008 A1 | 5/2008 | Kasai et al. |
| 2008/0106009 A1 | 5/2008 | Naruse et al. |
| 2008/0111274 A1 | 5/2008 | Kawai et al. |
| 2008/0115597 A1 | 5/2008 | Ohno et al. |
| 2008/0116200 A1 | 5/2008 | Kawai et al. |
| 2008/0116601 A1 | 5/2008 | Naruse et al. |
| 2008/0120950 A1 | 5/2008 | Ohno et al. |
| 2008/0136053 A1 | 6/2008 | Kuribayashi et al. |
| 2008/0136062 A1 | 6/2008 | Kasai et al. |
| 2008/0138567 A1 | 6/2008 | Ninomiya et al. |
| 2008/0150200 A1 | 6/2008 | Tajima |
| 2008/0157445 A1 | 7/2008 | Kawai et al. |
| 2008/0160249 A1 | 7/2008 | Makino |
| 2008/0174039 A1 | 7/2008 | Saijo et al. |
| 2008/0179781 A1 | 7/2008 | Iwata |
| 2008/0187712 A1* | 8/2008 | Ichikawa et al. ............. 428/116 |
| 2008/0190081 A1 | 8/2008 | Oshimi |
| 2008/0190083 A1 | 8/2008 | Oshimi |
| 2008/0197544 A1 | 8/2008 | Saijo et al. |
| 2008/0213485 A1 | 9/2008 | Shibata |
| 2008/0236115 A1 | 10/2008 | Sakashita |
| 2008/0236122 A1 | 10/2008 | Ito |
| 2008/0236724 A1 | 10/2008 | Higuchi |
| 2008/0237428 A1 | 10/2008 | Kobayashi et al. |
| 2008/0237942 A1 | 10/2008 | Takamatsu |
| 2008/0241015 A1 | 10/2008 | Kudo et al. |
| 2008/0241444 A1 | 10/2008 | Oshimi |
| 2008/0241466 A1 | 10/2008 | Saito et al. |
| 2008/0251977 A1 | 10/2008 | Naruse et al. |
| 2008/0284067 A1 | 11/2008 | Naruse et al. |
| 2008/0305259 A1 | 12/2008 | Saijo |
| 2008/0318001 A1 | 12/2008 | Sakakibara |
| 2009/0004431 A1 | 1/2009 | Ninomiya |
| 2009/0029104 A1* | 1/2009 | Iwata et al. .................. 428/116 |
| 2009/0107879 A1 | 4/2009 | Otsuka et al. |
| 2009/0130378 A1 | 5/2009 | Imaeda et al. |

FOREIGN PATENT DOCUMENTS

| | | |
|---|---|---|
| EP | 1612197 | 1/2006 |
| EP | 1698604 | 9/2006 |
| EP | 1698604 A1 * | 9/2006 |
| EP | 1736459 | 12/2006 |
| EP | 1790623 | 5/2007 |
| JP | 2002-102627 | 4/2002 |
| JP | 2003328725 A * | 11/2003 |
| JP | 2004-283669 | 10/2004 |
| JP | 2006-326574 | 12/2006 |
| WO | WO 03/031371 | 4/2003 |
| WO | WO 2005/047210 | 5/2005 |
| WO | WO 2006098191 A1 * | 9/2006 |
| WO | WO 2006/137150 | 12/2006 |

* cited by examiner

A-A line cross-sectional view

US 8,147,634 B2

HONEYCOMB STRUCTURE AND METHOD FOR MANUFACTURING HONEYCOMB STRUCTURE

CROSS-REFERENCE TO RELATED APPLICATIONS

The present application claims priority under 35 U.S.C. §119 to PCT Application No. PCT/JP2007/062505, filed Jun. 21, 2007, the contents of which are incorporated herein by reference in their entirety.

BACKGROUND OF THE INVENTION

1. Field of the Invention

The present invention relates to a honeycomb structure and a method for manufacturing the honeycomb structure.

2. Discussion of the Background

In recent years, particulate matter (hereinafter, also referred to as "PM") such as soot contained in exhaust gases discharged from internal combustion engines of vehicles such as buses and trucks, and construction machines has raised serious problems as contaminants harmful to the environment and the human body. For this reason, a honeycomb structure including a porous ceramic, in which a plurality of honeycomb fired bodies, each having a large number of cells longitudinally disposed in parallel with one another with a cell wall therebetween and including as a main component a porous ceramic made of a silicon carbide, are bonded to one another by interposing an adhesive layer to form a ceramic block and a sealing material layer is formed on a peripheral portion, is proposed as a filter which captures the PM in exhaust gases and purifies the exhaust gases.

Further, a honeycomb structure capable of converting a toxic component in exhaust gases by supporting a catalyst on a cell wall has been also proposed.

In a case where a honeycomb structure of this kind is used as an exhaust gas purifying filter, a regenerating treatment of the honeycomb structure by burning to remove captured PM is carried out after a certain time period of use. The regenerated honeycomb structure is repeatedly used as the exhaust gas purifying filter. Here, the honeycomb structure is to be exposed to a high temperature by a burning of PM during the regenerating treatment.

When honeycomb fired bodies are adhered to one another to manufacture a ceramic block upon manufacturing the honeycomb structure of this kind, a spacer (cavity-holding member) as disclosed in JP2002-102627A, WO03/031371A, and JP2004-283669A is used to maintain an even thickness of the adhesive layer.

The contents of JP2002-102627A, WO03/031371A and JP2004-283669A are incorporated herein by reference in their entirety.

SUMMARY OF THE INVENTION

A honeycomb structure of the present invention includes a ceramic block and a sealing material layer. The ceramic block includes a plurality of honeycomb fired bodies each having a large number of cells longitudinally disposed substantially in parallel with one another with a cell wall between the cells, an adhesive layer for bonding side faces of the honeycomb fired bodies, and a cavity-holding member placed between the side faces of the honeycomb fired bodies. The sealing material layer is formed on a peripheral face of the ceramic block. The cavity-holding member includes a nonflammable material having Young's modulus of at least about 0.001 GPa and at most about 0.07 GPa.

A method for manufacturing a honeycomb structure of the present invention includes molding a ceramic raw material to manufacture a honeycomb molded body having a plurality of cells longitudinally disposed substantially in parallel with one another with a cell wall between the cells. The honeycomb molded body is fired to manufacture a honeycomb fired body. A plurality of the honeycomb fired bodies are bonded to manufacture a ceramic block by placing a cavity-holding member between side faces of the honeycomb fired bodies, forming an adhesive paste layer, and then, solidifying the adhesive paste layer by heating. The cavity-holding member includes a nonflammable material having Young's modulus of at least about 0.001 GPa and at most about 0.07 GPa.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
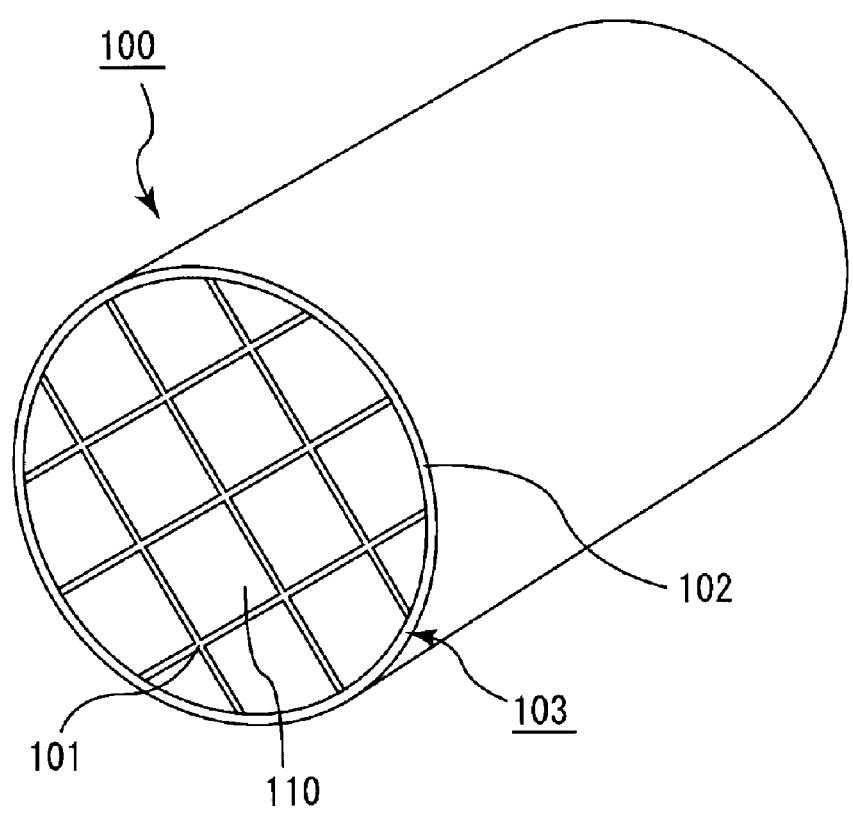
FIG. 1 is a perspective view schematically showing the honeycomb structure of the first embodiment of the present invention.

The embodiments will now be described with reference to the accompanying drawings, wherein like reference numerals designate corresponding or identical elements throughout the various drawings.

A honeycomb structure according to an embodiment of the present invention includes: a ceramic block including a plurality of pillar-shaped honeycomb fired bodies each having a large number of cells longitudinally disposed in parallel with one another with a cell wall between the cells, an adhesive layer for bonding side faces of the honeycomb fired bodies, and a cavity-holding member placed between the side faces of the honeycomb fired bodies; and a sealing material layer formed on a peripheral face of the ceramic block, wherein the cavity-holding member includes a nonflammable material having Young's modulus of at least about 0.001 GPa and at most about 0.07 GPa.

In the honeycomb structure according to the embodiment of the present invention, since the cavity-holding members each having Young's modulus of at least about 0.001 GPa and at most about 0.07 GPa are placed between the side faces of the honeycomb fired bodies, a depression of the cavity-holding members tends to keep the honeycomb fired bodies parallel without causing damage therein, even in a case where the thickness of the cavity-holding members are uneven. Consequently, the honeycomb structure tends to be allowed to have the adhesive layer having a less uneven thickness.

In the honeycomb structure according to the embodiment of the present invention, since the cavity-holding member includes the nonflammable material, the cavity-holding member tends not to be burned down during the regenerating treatment and a space tends not to be generated in the adhesive layer.

Accordingly, it may become easier to prevent a crack in the adhesive layer even the thermal stress is applied during the regenerating treatment.

Further, in the honeycomb structure according to the embodiment of the present invention, since the cavity-holding member has Young's modulus of at least about 0.01 GPa and at most about 0.07 GPa, an elasticity of the cavity-holding member is high. Therefore, the cavity-holding member tends to absorb the thermal stress applied during the regenerating treatment, so that the thermal stress to be applied to the adhesive layer tends to be alleviated. Accordingly, the crack tends not to occur in the adhesive layer from the interface between the cavity-holding member and the adhesive layer, and further, it may become easier to prevent an occurrence of the crack in the sealing material layer from the interface between the cavity-holding member and the sealing material layer.

Further, since no space tends to be generated in the adhesive layer, the sealing material layer tends not to be caved therein. Accordingly, the honeycomb structure can be allowed to have the sealing material layer with no hole formed therein.

The honeycomb structure including the sealing material layer with no hole formed therein can be suitably used as the exhaust gas purifying filter, since exhaust gases containing PM tend not to be allowed to leak from a hole.

Further, when the honeycomb structure including the sealing material layer with no hole formed therein is immersed in a solution containing a catalyst so that the catalyst is supported thereon, the catalyst solution tends not to be leaked from a hole. Therefore, the catalyst can be supported on the cell wall uniformly, and the honeycomb structure can be used as the exhaust gas purifying filter or a catalyst supporting carrier.

In the honeycomb structure according to an embodiment of the present invention, the cavity-holding member includes a material which tends not to be burned at a temperature of about 700° C.

Usually, a temperature of the cavity-holding member during the regenerating treatment reaches at least about 500° C. and at most about 600° C. Therefore, by using the cavity-holding member including the material of this kind, it may become easier to prevent the cavity-holding member from being burned down during the regenerating treatment.

In the honeycomb structure according to an embodiment of the present invention, the cavity-holding member includes a fibrous paper or an inorganic material sheet.

This kind of material is a sheet-shaped material and easy to be processed. Consequently, the honeycomb structure tends to be allowed to have the cavity-holding member which has Young's modulus of at least about 0.001 GPa and at most about 0.07 GPa and tends not to be burned down at a temperature of about 700° C.

In the honeycomb structure according to an embodiment of the present invention, the cavity-holding member includes fibers and inorganic particles.

In the honeycomb structure according to an embodiment of the present invention, the fibers are at least one kind selected from the group consisting of alumina fibers, zirconia fibers, alumina-silica fibers, silica fibers, glass fibers, calcium silicate fibers, magnesium silicate fibers, rock wool, glass wool, mineral fibers and synthetic fibers.

In the honeycomb structure according to an embodiment of the present invention, the inorganic particles are at least one kind selected from the group consisting of silica, titania, alumina, zirconia, spinel, magnesia, aluminum hydroxide, calcium carbonate, talc, calcium silicate, magnesium silicate, perlite, vermiculite and diatomite.

In accordance with the honeycomb structure according to the embodiments of the present invention, the honeycomb structure tends to be allowed to have the cavity-holding member including the material which tends not to be burned down at about 700° C.

A method for manufacturing a honeycomb structure according to an embodiment of the present invention includes: molding a ceramic raw material to manufacture a pillar-shaped honeycomb molded body having a large number of cells longitudinally disposed in parallel with one another with a cell wall between the cells; firing the honeycomb molded body to manufacture a honeycomb fired body; and bonding a plurality of the honeycomb fired bodies to manufacture a ceramic block by placing a cavity-holding member between side faces of the honeycomb fired bodies, forming an adhesive paste layer, and then, solidifying the adhesive paste layer by heating, wherein the cavity-holding member includes a nonflammable material having Young's modulus of at least about 0.001 GPa and at most about 0.07 GPa.

In accordance with the method for manufacturing the honeycomb structure according to the embodiment of the present invention, since the cavity-holding members each having Young's modulus of at least about 0.001 GPa and at most about 0.07 GPa are placed between the side faces of the honeycomb fired bodies, a depression of the cavity-holding members tends to keep the honeycomb fired bodies parallel without causing damage therein, even in a case where the thickness of the cavity-holding members are uneven. Consequently, the honeycomb structure including the adhesive layer having the less uneven thickness tends to be manufactured.

Further, since the cavity-holding member is nonflammable, the cavity-holding member tends not to be burned down to generate a space in the adhesive layer while the adhesive paste layer is solidified to form the adhesive layer by heating.

Accordingly, the honeycomb structure having the adhesive layer with no space generated therein tends to be manufactured.

Further, the cavity-holding member used in the method for manufacturing the honeycomb structure according to the embodiment of the present invention has Young's modulus of at least about 0.001 GPa and at most about 0.07 GPa. This cavity-holding member has high elasticity and tends to be capable of alleviating the thermal stress applied to the honeycomb structure during the regenerating treatment. Therefore, in the method for manufacturing the honeycomb structure according to the embodiment of the present invention, it may become easier to manufacture a honeycomb structure in which a crack tends not to occur in the adhesive layer from the interface between the cavity-holding member and the adhesive layer nor in the sealing material layer from the interface between the cavity-holding member and the sealing material layer.

In the method for manufacturing the honeycomb structure according to an embodiment of the present invention, the cavity-holding member includes a material which tends not to be burned down at about 700° C.

Usually, a temperature of the cavity-holding member during the regenerating treatment reaches at least about 500° C. and at most about 600° C. Therefore, by using the cavity-holding member including the material of this kind, it may become easier to manufacture a honeycomb structure including the cavity-holding member which tends not to be burned down during the regenerating treatment.

In the method for manufacturing the honeycomb structure according to an embodiment of the present invention, the cavity-holding member includes a fibrous paper or an inorganic material sheet.

This kind of material is a sheet-shaped material and easy to be processed. Consequently, it is possible to easily manufacture a honeycomb structure including the cavity-holding member which has Young's modulus of at least about 0.001 GPa and at most about 0.07 GPa and tends not to be burned down at about 700° C.

In the method for manufacturing the honeycomb structure according to an embodiment of the present invention, the cavity-holding member includes fibers and inorganic particles.

In the method for manufacturing the honeycomb structure according to an embodiment of the present invention, the fibers are at least one kind selected from the group consisting of alumina fibers, zirconia fibers, alumina-silica fibers, silica fibers, glass fibers, calcium silicate fibers, magnesium silicate fibers, rock wool, glass wool, mineral fibers and synthetic fibers.

In the method for manufacturing the honeycomb structure according to an embodiment of the present invention, the inorganic particles are at least one kind selected from the group consisting of silica, titania, alumina, zirconia, spinel, magnesia, aluminum hydroxide, calcium carbonate, talc, calcium silicate, magnesium silicate, perlite, vermiculite and diatomite.

In accordance with the method for manufacturing the honeycomb structure according to the embodiments of the present invention, it is possible to manufacture a honeycomb structure having the cavity-holding member including the material which tends not to be burned down at about 700° C.

The method for manufacturing the honeycomb structure according to an embodiment of the present invention further includes: grinding a periphery of the ceramic block; and forming a sealing material layer on a peripheral face of the ceramic block having the ground periphery.

In accordance with the method for manufacturing the honeycomb structure according to the embodiment of the present invention, since the cavity-holding member is nonflammable, the cavity-holding member tends not to be burned down to generate a space in the adhesive layer. Therefore, the sealing material layer tends not to be caved in and it may become easier to manufacture a honeycomb structure including the sealing material layer with no hole formed therein.

In the method for manufacturing the honeycomb structure according to an embodiment of the present invention, the ceramic block is manufactured by manufacturing a plurality of kinds of honeycomb fired bodies and bonding the plurality of kinds of honeycomb fired bodies.

In accordance with the method for manufacturing the honeycomb structure according to the embodiment of the present invention, since the periphery of the ceramic block is not required to be ground, manufacturing tends to be simplified. Further, a waste of the material caused by grinding tends to be avoided.

The method for manufacturing the honeycomb structure according to an embodiment of the present invention further includes sealing either one end of each of the cells.

In accordance with the method for manufacturing the honeycomb structure according to the embodiment of the present invention, it may become easier to manufacture a honeycomb structure including the cells sealed at either one end, which can be suitably used as the exhaust gas purifying filter.

The method for manufacturing the honeycomb structure according to an embodiment of the present invention further includes: forming a sealing material layer; and supporting a catalyst on the cell wall by immersing the honeycomb structure in a solution containing the catalyst.

In accordance with the method for manufacturing a honeycomb structure according to the embodiment of the present invention, since the honeycomb structure including the sealing material layer with no hole formed therein is immersed in the solution containing a catalyst so that the catalyst is supported thereon, the catalyst solution tends not to be leaked from a hole and the honeycomb structure having the catalyst uniformly supported thereon tends to be manufactured.

JP2002-102627A discloses that the even thickness of the adhesive layer can be maintained by the following procedure: forming an adhesive paste layer on a honeycomb fired body, placing a cavity-holding member made of a cardboard on the adhesive paste layer, and placing another honeycomb fired body on the cavity-holding member, thereby sandwiching the cavity-holding member between two honeycomb fired bodies.

According to the method for manufacturing a conventional honeycomb structure disclosed in JP2002-102627A, the adhesive layer is formed by solidifying the adhesive paste through heating after sandwiching the cavity-holding member between two honeycomb fired bodies. At this time, the cavity-holding member is exposed to high temperatures.

Since the cavity-holding member made of the cardboard has a low heat resistance, the cavity-holding member may be burned down by an exposure to the high temperature. Accordingly, the conventional honeycomb structure disclosed in JP2002-102627A may have a space in the adhesive layer.

Further, since the honeycomb structure is also exposed to the high temperatures during the regenerating treatment, the cavity-holding member may be burned down to generate a space (cavity) in the adhesive layer.

There is a problem that, in a case where there is a space in the adhesive layer of the honeycomb structure, a thermal stress applied during the regenerating treatment may cause a crack in the adhesive layer.

Further, when the position of the cavity-holding member is overlapped with or close to the position which is to be a peripheral face of the ceramic block, burning of the cavity-holding member may generate a space in the adhesive layer inside the sealing material layer (peripheral coat layer), resulting in caving of the sealing material layer in the space to form a hole in the sealing material layer.

Furthermore, with the space in the adhesive layer inside the sealing material layer, even in a case where there is no hole formed in the sealing material layer immediately after the manufacture of the honeycomb structure, an impact applied during a carriage or a use of the honeycomb structure may cause a sudden caving of the sealing material layer to form a hole in the sealing material layer.

Figure 6:
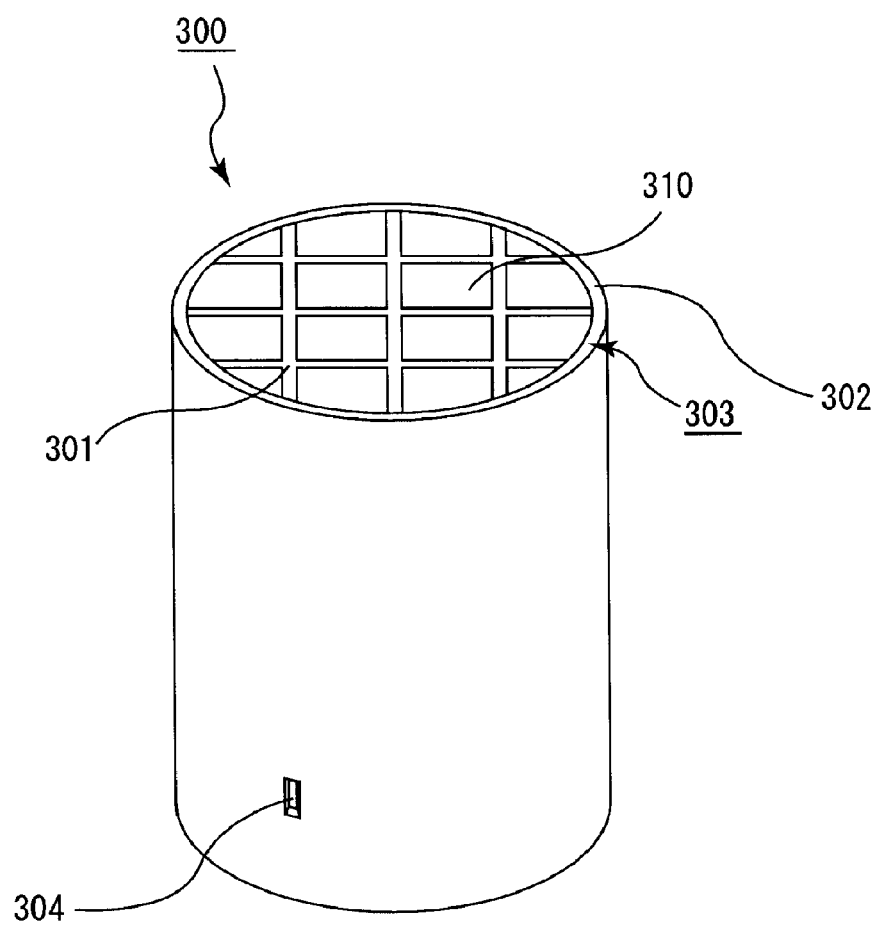
FIG. 6 is a perspective view schematically showing one example of a conventional honeycomb structure with a hole formed in the sealing material layer.

FIG. 6 is a perspective view schematically showing a conventional honeycomb structure with a hole formed in the sealing material layer.

In a conventional honeycomb structure 300 shown in FIG. 6, a plurality of pillar-shaped honeycomb fired bodies 310 are bonded to form a ceramic block 303 by interposing an adhesive layer 301 and a sealing material layer 302 is formed on a periphery of the ceramic block 303.

Further, there is a hole 304 formed in the sealing material layer 302.

A position of the hole 304 is outside of a position where the adhesive layer 301 and the sealing material layer 302 overlap one another in FIG. 6, and the hole 304 reaches an interior of the adhesive layer 301 inside the sealing material layer 302.

In the honeycomb structure 300 with the hole 304 formed in the sealing material layer 302 as shown in FIG. 6, there is a problem that, when the honeycomb structure 300 is immersed in a solution containing a catalyst to support the catalyst on a cell wall, it becomes difficult to support the catalyst uniformly on the cell wall of the honeycomb structure 300, since the catalyst solution leaks from the hole 304. Further, there is a problem that, in the case that the honeycomb structure 300 with the hole 304 formed in the sealing material layer 302 is used as an exhaust gas purifying filter, the honeycomb structure 300 fails to function as the exhaust gas purifying filter sufficiently, since exhaust gases containing PM may leak from the hole 304.

These problems can be solved by plugging the hole in the sealing material layer with a sealing material paste again to seal the hole. However, it is a cumbersome task and there is a problem that plugging the hole completely again is difficult.

In WO03/031371A, an inorganic material containing a ceramic is used as the cavity-holding member. This kind of cavity-holding member has high heat resistance, and therefore, the cavity-holding member is not to be burned down during the solidification of the adhesive paste by heating or the regenerating treatment. Consequently, generating a hole in the sealing material layer can be prevented.

Moreover, JP2004-283669A discloses a honeycomb structure including a cavity-holding member made of a porous ceramic having Young's modulus of 0.1 to 1.5 GPa. This kind of cavity-holding member is regarded not to be burned down during the regenerating treatment and to be capable of preventing damage in the honeycomb fired body caused by a pressure applied thereto when the honeycomb fired bodies are bonded.

However, in the conventional honeycomb structure including the cavity-holding member of WO03/031371A and JP2004-283669A, a thermal stress applied during the regenerating treatment may cause a crack in the adhesive layer started from an interface between the cavity-holding member and the adhesive layer or a crack in the sealing material layer started from an interface between the cavity-holding member and the sealing material layer, and the crack may be extended to reach the peripheral face or the end face of the honeycomb structure.

Further, in the honeycomb structure with a crack reaching the peripheral face or the end face thereof, since exhaust gases may flow out from the crack, the honeycomb structure may fail to function as the exhaust gas purifying filter.

According to the embodiments of the present invention, it is possible to obtain a honeycomb structure, in which a cavity-holding member tends not to be burned down during the regenerating treatment and a crack tends not to occur in an adhesive layer or a sealing material layer during the regenerating treatment, and a method for manufacturing a honeycomb structure.

First Embodiment

The following will discuss a first embodiment, which is one embodiment of the present invention, with reference to drawings.

Figure 2A:
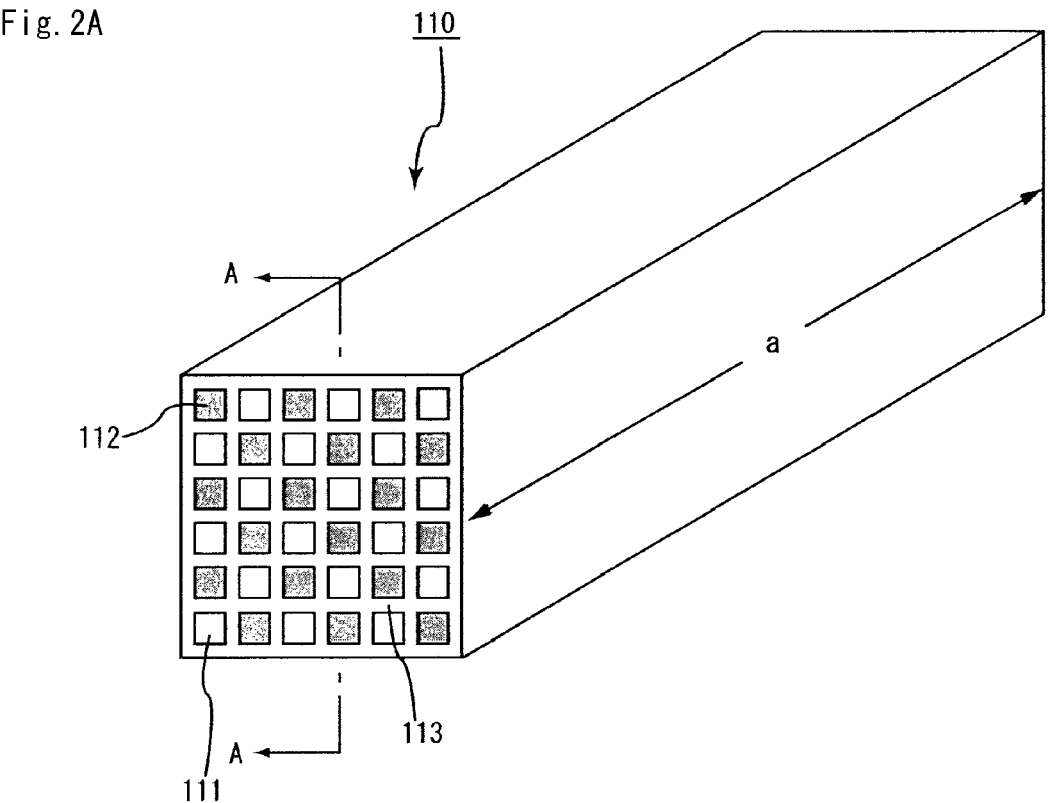
FIG. 2A is a perspective view schematically showing one example of the honeycomb fired body of one embodiment of the present invention.

FIG. 1 is a perspective view schematically showing one example of the honeycomb structure of an embodiment of the present invention. FIG. 2A is a perspective view schematically showing one example of the honeycomb fired body forming the honeycomb structure of an embodiment of the present invention, and FIG. 2B is an A-A line cross sectional view of the honeycomb fired body shown in FIG. 2A.

Figure 2B:
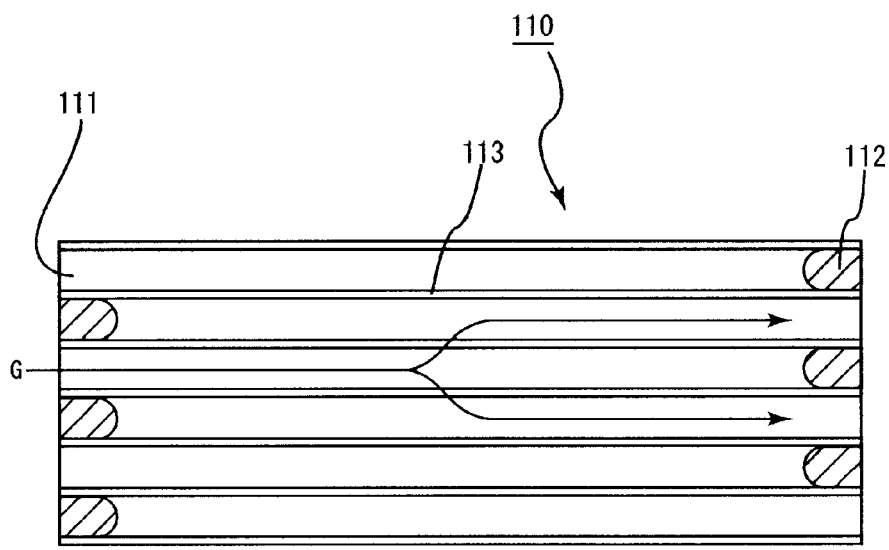
FIG. 2B is an A-A line cross-sectional view of the honeycomb fired body shown in FIG. 2A.

In a honeycomb structure 100 shown in FIG. 1, a plurality of honeycomb fired bodies 110 made of porous silicon carbide, each having a shape as shown in FIGS. 2A and 2B, are bonded with one another by interposing a sealing material layer (adhesive layer) 101 to form a ceramic block 103, and a sealing material layer (coat layer) 102 is further formed on the periphery of this ceramic block 103.

In a honeycomb fired body 110 shown in FIGS. 2A and 2B, a large number of cells 111 are longitudinally disposed in parallel with one another (in a direction shown by an arrow a in FIG. 2A) with a cell wall 113 therebetween, and either one end of each of the cells 111 is sealed with a plug 112. Therefore, exhaust gases G having flowed into the cells 111 each having an opening on one end face surely passes through the cell wall 113 that separates the cells 111, and flows out from other cells 111 each having an opening on the other end face.

Accordingly, the cell wall 113 functions as a filter for capturing PM and the like.

Figure 3:
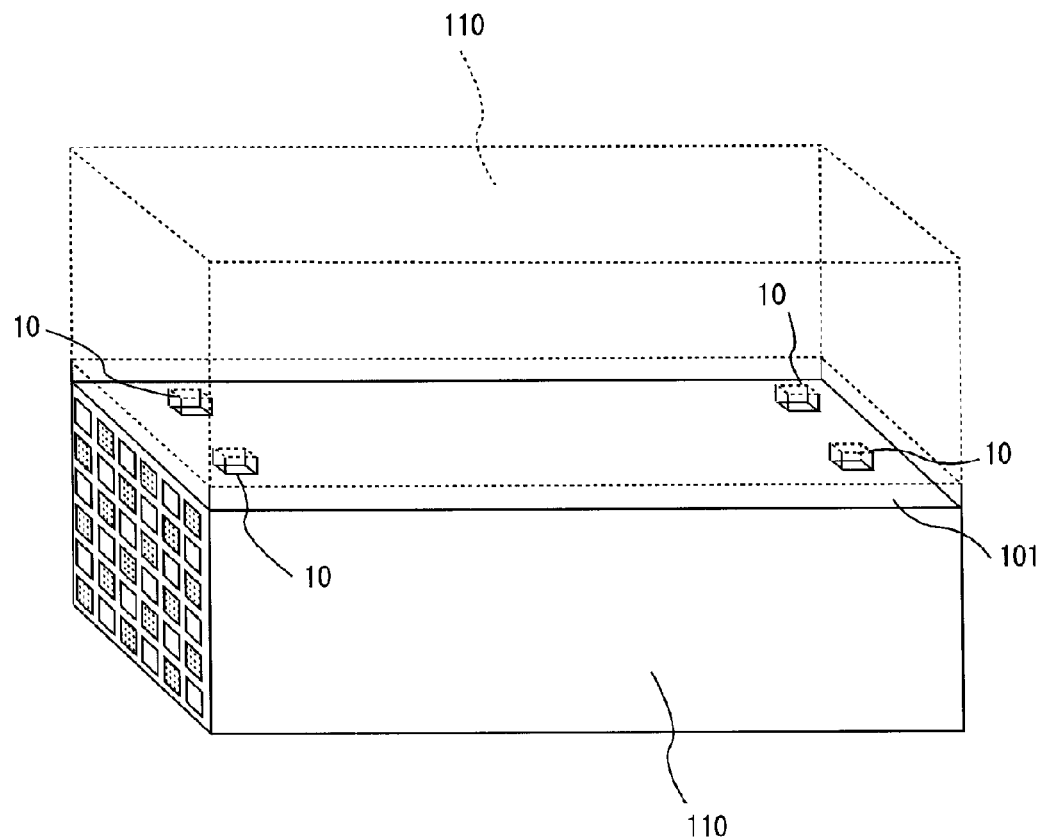
FIG. 3 is a perspective view schematically showing a state of a honeycomb fired body of one embodiment of the present invention with an adhesive layer and a cavity-holding member provided on a side face.

FIG. 3 is a perspective view schematically showing a state of a honeycomb fired body of an embodiment of the present invention with an adhesive layer and a cavity-holding member provided on a side face.

In the honeycomb structure of the present embodiment, a side face of the rectangular pillar-shaped honeycomb fired body 110 indicated by a solid line and a side face of another rectangular pillar-shaped honeycomb fired body 110 indicated by a dotted line are bonded by the adhesive layer 101.

This adhesive layer 101 is formed by solidifying an adhesive paste including an inorganic binder, an organic binder, and at least one of inorganic fibers and whiskers.

Between the side faces of two honeycomb fired bodies 110, a total of four cavity-holding members 10 are placed on the side face of the honeycomb fired body 110 in the neighborhood of each corners.

A ceramic block is formed by combining 4×4 pcs of the honeycomb fired bodies in such a manner as shown in FIG. 3. Further, a round pillar-shaped ceramic block as shown in FIG. 1 is formed by processing a periphery thereof.

Here, even a position of the cavity-holding member 10 is close to or in contact with the sealing material layer 102, there is no hole formed in the sealing material layer 102.

Further, the cavity-holding member 10 has a rectangular pillar shape and is provided to keep an even thickness of the adhesive layer 101. Accordingly, the thickness of the adhesive layer 101 is almost the same thickness of the cavity-holding member 10.

The cavity-holding member 10 in the present embodiment has Young's modulus of at least about 0.001 GPa and at most about 0.07 GPa.

Further, most of the materials included in the cavity-holding member 10 are inorganic materials having high heat resistance. Therefore, the cavity-holding member 10 is nonflammable as a whole and tends not to be burned down even heated to about 700° C.

When the regenerating treatment of the honeycomb structure is carried out by burning PM in the exhaust gas purifying filter, the temperature of the honeycomb structure reaches at least about 500° C. and at most about 600° C. In a case where this kind of cavity-holding member is used, the cavity-holding member tends not to be burned down even the regenerating treatment is carried out.

Further, there may be a case where more PM is burned locally during the regenerating treatment, and in that case, the temperature of the honeycomb structure may rise to about 1000° C. Therefore, the cavity-holding member more desirably tends not to be burned down even heated to about 1000° C.

The cavity-holding member 10 desirably includes a fibrous paper or an inorganic material sheet, especially, a material formed by fibers and inorganic particles.

The fibrous paper includes inorganic fibers as a main component and is a material processed into a so-called sheet shape, such as a paper shape, a mat shape and a felt shape. The inorganic material sheet includes at least one of inorganic particles and fine fibers as a main component and is a material processed into a sheet shape.

The fibers are desirably at least one kind selected from the group consisting of alumina fibers, zirconia fibers, alumina-silica fibers, silica fibers, glass fibers, calcium silicate fibers, magnesium silicate fibers, rock wool, glass wool, mineral fibers and synthetic fibers.

The inorganic particles are desirably at least one kind selected from the group consisting of silica, titania, alumina, zirconia, spinel, magnesia, aluminium hydroxide, calcium carbonate, talc, calcium silicate, magnesium silicate, perlite, vermiculite and diatomite.

Further, at least one of the fibers and the inorganic particles may be blended with inorganic particles such as MgO, CaO and feldspar, an organic material such as a wood pulp and an organic binder, and an inorganic filler other than the above-mentioned inorganic particles.

Moreover, the cavity-holding member 10 desirably has a density of at least about 0.8 g/cm$^3$ and at most about 2.0 g/cm$^3$.

The cavity-holding member having a density in the range of about 0.8 g/cm$^3$ to about 2.0 g/cm$^3$ tends to reduce the pressure applied to a contact part with the cavity-holding member in the side face of the honeycomb fired body, and consequently, a scratch in the honeycomb fired body tends to be prevented.

Furthermore, the cavity-holding member 10 desirably includes a material having a reduction rate of thickness of at least about 20% and at most about 50% under a load of 5 MPa applied in a direction of thickness. With the reduction rate of thickness within this range, the cavity-holding member is deformed by the pressure applied to the side face of the honeycomb fired body when the honeycomb fired bodies are combined. Therefore, it may become easier to alleviate the pressure applied to the contact part with the cavity-holding member in the side face of the honeycomb fired body, and to prevent a scratch on the side face of the honeycomb fired body.

Here, the reduction rate of thickness under the load of 5 MPa applied in the direction of thickness can be calculated by applying a load of 5 MPa in the direction of thickness on each of the cavity-holding members by using an instron tester, and comparing the thicknesses of the cavity-holding member before and after applying the load.

The load of 5 MPa is a general load applied to the honeycomb fired body when the honeycomb fired bodies are combined. The load of 5 MPa applied to the cavity-holding member reduce the thickness of the cavity-holding member to a certain thickness, and then, it becomes difficult to further reduce the thickness of the cavity-holding member. Therefore, it may become easier to keep an equal distance between the honeycomb fired bodies.

Here, the load of 5 MPa is taken as an example; however, the cavity-holding member desirably has a reduction rate of thickness of at least about 20% and at most about 50% under a load corresponding to the load applied when the honeycomb fired bodies are combined.

Presumably, it is desirable that Young's modulus of the cavity-holding member is at least about 0.001 GPa and at most about 0.02 GPa so that the cavity-holding member has the reduction rate of thickness of at least about 20% and at most about 50%.

Furthermore, when the regenerating treatment is carried out by using as an exhaust gas purifying filter a honeycomb structure with a scratch occurred on a part in contact with the cavity-holding member, in the side face of the honeycomb fired body, during the manufacture of the honeycomb structure, there may be a case where a crack occurs in the honeycomb fired body with a scratch on the side face thereof.

In the embodiments of the present invention, a scratch tends to be prevented from occurring on the contact part with the cavity-holding member in the side face of the honeycomb fired body upon manufacturing the honeycomb structure.

Hereinafter, the following will discuss the method for manufacturing a honeycomb structure of the present embodiment.

First, a mixed powder is prepared by mixing silicon carbide powders each having different average particle diameters as a ceramic material and an organic binder, and concurrently, a mixed liquid is prepared by mixing a liquid plasticizer, a lubricant, and water. Then, the mixed powder and the mixed liquid are mixed by using a mixing machine, so that a wet mixture for manufacturing a molded body is prepared.

Successively, a honeycomb molded body in a predetermined shape is manufactured by charging the wet mixture into an extrusion-molding machine and extrusion-molding the wet mixture.

The both ends of the honeycomb molded body are cut by using a cutting apparatus, so that a honeycomb molded body having a predetermined length is obtained. Then the cut honeycomb molded body is dried using a drying apparatus. Next, a predetermined amount of a plug material paste is filled into an end on the gas outlet side of each of cells which is to have an opening on the end face on the gas inlet side, and into an end on the gas inlet side of each of cells which is to have an opening on the end face on the gas outlet side, so that each of the cells is sealed.

A cell-sealed honeycomb molded body is manufactured through these processes.

Next, the cell-sealed honeycomb molded body is degreased in a degreasing furnace by heating an organic matter contained therein, and the degreased honeycomb molded body is conveyed to a firing furnace and fired therein, so that a honeycomb fired body is manufactured.

Successively, between the side faces of the honeycomb fired bodies, the cavity-holding members are placed and an adhesive paste layer is formed. Then, the adhesive paste layer is solidified by heating, so that a plurality of honeycomb fired bodies is bonded to form a ceramic block.

The above-mentioned bonding will be described in detail as follows.

First, the adhesive paste layer is formed on the side face of the honeycomb fired body.

A honeycomb fired body is placed on a stage having a V shape in cross section along the V shape. An adhesive paste including an inorganic binder, an organic binder, and at least one of inorganic fibers and whiskers are applied with a squeegee and the like to two upper side faces of the honeycomb fired body to form an adhesive paste layer having a predetermined thickness.

Next, cavity-holding members are placed on the adhesive paste layer. Here, a material, a characteristic, and a position of the cavity-holding member are already described in the description of the honeycomb structure, and the description thereof is not repeated here.

Subsequently, another honeycomb fired body is placed on the cavity-holding members. By placing another honeycomb fired body on the cavity-holding members, the cavity-holding member is sandwiched between the side faces of the honeycomb fired bodies.

A honeycomb aggregated body having a predetermined size is manufactured by repeating applying the adhesive paste on the upper side faces of these honeycomb fired bodies to form an adhesive paste layer, placing the cavity-holding member on the adhesive paste layer and again placing another honeycomb fired body on the cavity-holding members.

Next, the adhesive paste layer is solidified to form an adhesive layer by heating the honeycomb aggregated body under a condition of a temperature of at least about 50° C. and at most about 150° C. for about one hour. Thus, a plurality of honeycomb fired bodies is bonded to form a ceramic block.

Thereafter, a periphery of the ceramic block is ground by using a diamond cutter to form a virtually round pillar-shaped ceramic block.

Further, a sealing material paste is applied to a peripheral face of the virtually round pillar-shaped ceramic block, then dried and solidified thereon to form a sealing material layer.

Here, as the sealing material paste, the same paste as the adhesive paste can be used.

The honeycomb structure of the embodiment of the present invention is manufactured through the above process.

In the following, effects of the honeycomb structure and the method for manufacturing the honeycomb structure of the present embodiment are listed.

(1) In the honeycomb structure of the present embodiment, the cavity-holding member is a material including fibers and inorganic particles.

The cavity-holding member including this kind of material is nonflammable as a whole. Therefore, when the adhesive paste is solidified by heating to form the adhesive layer or when the regenerating treatment is carried out, the cavity-holding member tends not to be burned down and a space tends not to be generated in the adhesive layer. Accordingly, even in a case where a thermal stress is applied during the regenerating treatment, a crack tends not to occur in the adhesive layer of the honeycomb structure.

(2) In the honeycomb structure of the present embodiment, the cavity-holding member having Young's modulus of at least about 0.001 GPa and at most about 0.07 GPa is placed between the side faces of the honeycomb fired bodies. Therefore, a depression of the cavity-holding member tends to keep the honeycomb fired bodies parallel without causing damage therein, even in a case where the thickness of the cavity-holding members are uneven. Consequently, the honeycomb structure tends to be allowed to have the adhesive layer having a less uneven thickness.

(3) In the honeycomb structure of the present embodiment, the cavity-holding member has Young's modulus of at least about 0.001 GPa and at most about 0.07 GPa. Therefore, the cavity-holding member has high elasticity and is capable of absorbing the thermal stress applied during the regenerating treatment, so that the thermal stress applied to the adhesive layer tends to be alleviated. Accordingly, in the honeycomb structure, a crack tends not to occur in the adhesive layer from the interface between the cavity-holding member and the adhesive layer nor in the sealing material layer from the interface between the cavity-holding member and the sealing material layer.

(4) In the honeycomb structure of the present embodiment, there is the cavity-holding member without being burned down, in the position close to or overlapped with a peripheral face of the ceramic block, and there is no hole formed in the sealing material layer.

Here, in the honeycomb structure including the sealing material layer with no hole formed therein, exhaust gases containing PM are not leaked from a hole, so that the function as the exhaust gas purifying filter or a catalyst supporting carrier tends to be fulfilled.

(5) Further, since the honeycomb structure of the present embodiment has the sealing material layer with no hole formed therein, when the honeycomb structure is immersed in a solution containing a catalyst, the solution containing a catalyst tends not to be leaked from a hole. Accordingly, by supporting the catalyst on the cell wall uniformly, the honeycomb structure can be used as the exhaust gas purifying filter or as the catalyst supporting carrier.

(6) In the honeycomb structure of the present embodiment, the cavity-holding member includes a material which tends not to be burned down at about 700° C. Therefore, even in a case where the temperature of the honeycomb structure rises to about 700° C. during the regenerating treatment, the cavity-holding member tends not to be burned down and a space tends not to be generated in the adhesive layer.

Accordingly, it is possible to prevent a hole formed in the sealing material layer caused by a caving of the sealing material layer after the regenerating treatment. Therefore, the honeycomb structure can be used as the exhaust gas purifying filter in which exhaust gases containing PM tend not to be leaked from a hole even after the regenerating treatment.

(7) In the method for manufacturing the honeycomb structure of the present embodiment, the cavity-holding member is nonflammable. Therefore, while the adhesive paste is solidified to form the adhesive layer by heating, a space tends not to be generated in the adhesive layer by burning of the cavity-holding member.

Accordingly, it may become easier to manufacture a honeycomb structure including the adhesive layer in which no space is generated therein.

(8) In the method for manufacturing the honeycomb structure of the present embodiment, since the cavity-holding members each having Young's modulus of at least about 0.001 GPa and at most about 0.07 GPa are placed between the side faces of the honeycomb fired bodies, a depression of the cavity-holding members tends to keep the honeycomb fired bodies parallel without causing damage therein even in a case where the thickness of the cavity-holding members are uneven. Consequently, it may become easier to manufacture the honeycomb structure including the adhesive layer having the less uneven thickness.

(9) The cavity-holding member used in the method for manufacturing the honeycomb structure of the present embodiment has Young's modulus of at least about 0.001 GPa and at most about 0.07 GPa. This cavity-holding member has high elasticity and tends to be capable of alleviating the thermal stress applied to the honeycomb structure during the regenerating treatment. Therefore, in the method for manufacturing the honeycomb structure of the present embodiment, it may become easier to manufacture a honeycomb structure in which a crack tends not to occur in the adhesive layer from the interface of the cavity-holding member and the adhesive layer and a crack tends not to occur in the sealing material layer from the interface between the cavity-holding member and the sealing material layer during the regenerating treatment.

(10) In the method for manufacturing the honeycomb structure of the present embodiment, since the cavity-holding member tends not to be burned down at about 700° C., it may become easier to manufacture a honeycomb structure in which the cavity-holding member tends not to be burned down during the regenerating treatment.

(11) In the method for manufacturing the honeycomb structure of the present embodiment, the periphery of the ceramic block is ground and the sealing material layer is formed on the peripheral face of the ceramic block having the ground periphery. Therefore, it is possible to manufacture the honeycomb structure with the sealing material layer formed thereon. Here, in the present embodiment, since it may become easier to manufacture the honeycomb structure including the adhesive layer with no space generated therein, the formed sealing material layer tends not to be caved in and it may become easier to manufacture a honeycomb structure including the sealing material layer with no hole formed therein.

EXAMPLES

The following will discuss the first embodiment of the present invention in more detail by using examples; however, the present invention is not limited only to these examples.

In the following Examples and Comparative Examples, honeycomb structures were manufactured by changing the materials of the cavity-holding members, and then, each of the characteristics were evaluated.

Example 1

Manufacturing of Honeycomb Fired Body

An amount of 52.8% by weight of a silicon carbide coarse powder having an average particle diameter of 22 µm and 22.6% by weight of a silicon carbide fine powder having an average particle diameter of 0.5 µm were mixed. To the resulting mixture, 2.1% by weight of an acrylic resin, 4.6% by weight of an organic binder (methylcellulose), 2.8% by weight of a lubricant (UNILUB, manufactured by NOF Corporation), 1.3% by weight of glycerin, and 13.8% by weight of water were added, and then kneaded to prepare a mixed composition. The obtained mixed composition was extrusion-molded, so that a raw honeycomb molded body having virtually the same shape as the shape shown in FIG. 2A and having cells not sealed was manufactured.

Next, the raw honeycomb molded body was dried by using a microwave drying apparatus to obtain a dried honeycomb molded body. A paste having the same composition as that of the raw molded body was then filled into predetermined cells, and the honeycomb molded body was again dried by using a drying apparatus.

The dried honeycomb molded body was degreased at 400° C., and then fired at 2200° C. under normal pressure argon atmosphere for three hours, so that a honeycomb fired body made of a silicon carbide sintered body, with a porosity of 45%, an average pore diameter of 15 µm, a size of 34.3 mm×34.3 mm×150 mm, the number of cells (cell density) of 300 pcs/inch and a thickness of the cell wall of 0.25 mm (10 mil), was manufactured.

(Preparation of Adhesive Paste)

An amount of 30% by weight of alumina fibers having an average fiber length of 20 µm, 21% by weight of silicon carbide particles having an average particle diameter of 0.6 µm, 15% by weight of silica sol, 5.6% by weight of carboxymethyl cellulose, and 28.4% by weight of water were mixed and kneaded to prepare an adhesive paste.

(Preparation of Cavity-Holding Member)

Cavity-holding member A: A slurry including glass fibers as a main component was prepared by adding glass fibers, wood pulp, feldspar and aluminum hydroxide into water and mixing it. Then, sheet forming and dehydration were carried out on the slurry, so that a sheet was formed.

Further, the sheet was dried to be made into a sheet having thickness of 1.0 mm.

Next, punching which uses a die was carried out to manufacture a cavity-holding member in a size of 8.0 mm in height×5.0 mm in width×1.0 mm in thickness.

Young's modulus of this cavity-holding member was measured, and was 0.001 GPa.

(Bonding of Honeycomb Fired Bodies)

A honeycomb fired body was placed on a stage having a V shape in cross section along the V shape. The adhesive paste was applied with a squeegee to the upper side face of the honeycomb fired body to form an adhesive paste layer.

Then, a total of four cavity-holding members were placed on the adhesive paste layer in the neighborhood of each corner.

More specifically, each of the cavity-holding members was placed at a position where a distance between the periphery of the cavity-holding member and each of two sides forming a corner of the side face of the honeycomb fired body was respectively 4.5 mm.

Here, the position where the cavity-holding member was placed will be described later.

Subsequently, another honeycomb fired body was placed on this adhesive layer and the cavity-holding members. A honeycomb aggregated body formed by vertically four pieces and horizontally four pieces of the honeycomb fired bodies was manufactured by repeating applying the adhesive paste on the side face of these honeycomb fired bodies, placing other cavity-holding members thereon, and further placing another honeycomb fired body.

At this time, thickness of the adhesive paste (distance between the honeycomb fired bodies) was made to be 1.0 mm.

Further, a ceramic block was manufactured by heating this honeycomb aggregated body at 120° C. and solidifying the adhesive paste layer to form an adhesive layer.

(Grinding and Forming of Sealing Material Layer of Ceramic Block)

Next, a periphery of the ceramic block was ground to a round pillar shape by using a diamond cutter.

Then, a sealing material paste layer having a thickness of 0.2 mm was formed on the peripheral portion of the ceramic block by using the sealing material paste including the same material as that of the adhesive paste. Further, this sealing material paste layer was dried at 120° C., so that a round pillar-shaped honeycomb structure having a size of 132.5 mm in diameter×150 mm in length, with a sealing material layer formed on the periphery thereof, was manufactured.

Examples 2 to 5

Honeycomb structures were manufactured in the same manner as in Example 1, except for the use of cavity-holding members each manufactured by changing a composition of a raw material so as to have Young's modulus of the value shown in Table 1.

Example 6

Cavity-holding member B: A slurry including alumina-silica fibers as a main component was prepared by adding alumina-silica fibers, wood pulp and vermiculite into water and mixing it. Then, a sheet forming and dehydration were carried out on the slurry, so that a sheet was formed. Thereafter, the cavity-holding member B was manufactured in the same manner as in the cavity-holding member A.

Young's modulus of the cavity-holding member was measured, and was 0.005 GPa.

A honeycomb structure was manufactured in the same manner as in Example 1, except that the cavity-holding member was used.

Example 7

Cavity-holding member C: A slurry including alumina fibers as a main component was prepared by adding alumina fibers, silica, CaO and MgO into water and mixing it. Then, a sheet forming and dehydration were carried out on the slurry, so that a sheet was formed. Thereafter, the cavity-holding member C was manufactured in the same manner as in the cavity-holding member A.

Young's modulus of the cavity-holding member was measured, and was 0.002 GPa.

A honeycomb structure was manufactured in the same manner as in Example 1, except that the cavity-holding member was used.

Comparative Example 1

A honeycomb structure was manufactured in the same manner as in Example 1, except that a cardboard was used as a cavity-holding member D. Young's modulus of the cardboard was 0.01 GPa.

Comparative Example 2 to 4

A slurry including 45% by weight of silicon carbide, 28% by weight of aluminosilicate fibers, 20% by weight of silica sol, 1% by weight of clay and 6% by weight of water was prepared, and a proper amount of resin foam was added thereto. Then, the resulting matter was dried and solidified to form a cavity-holding member E.

In each of these Comparative Examples 2 to 4, Young's modulus of the cavity-holding member was controlled by changing the added amount of the resin foam. Thus, the cavity-holding members each having Young's modulus shown in Table 1 were manufactured and used.

Honeycomb structures were manufactured in the same manner as in Example 1, except that cavity-holding members of these kinds were used.

(Heat Resistance Test on Cavity Holding Member at 700° C.)

Each of the cavity-holding members was placed in a drying furnace after the weight thereof was measured. A heating treatment was carried out by keeping the cavity-holding member in the furnace at the temperature of 700° C. for one hour, and thereafter, the weight thereof was measured again.

Then, a rate of the weight change was measured and the cavity-holding member having the rate of the weight change of less than 80% was determined to be nonflammable at 700° C. In this case, a test result was indicated by "+" in Table 1.

In contrast, in a case where the rate of the weight change was 80% or more, the cavity-holding member was determined to be not nonflammable at 700° C. In this case, the test result was indicated by "−" in Table 1.

(Evaluation on Characteristics of Honeycomb Structure After Manufacture)

A presence or absence of a hole in the sealing material layer of each of the honeycomb structures was visually observed. In Table 1, "+" indicates that no hole was observed and "−" indicates that a hole was observed.

(Evaluation on Characteristics of Honeycomb Structure After Regenerating Treatment)

The regenerating treatment was carried out on each of the honeycomb structures in the following procedure, and then, an evaluation on the characteristics of the honeycomb structures after regenerating treatment was carried out.

Figure 4:
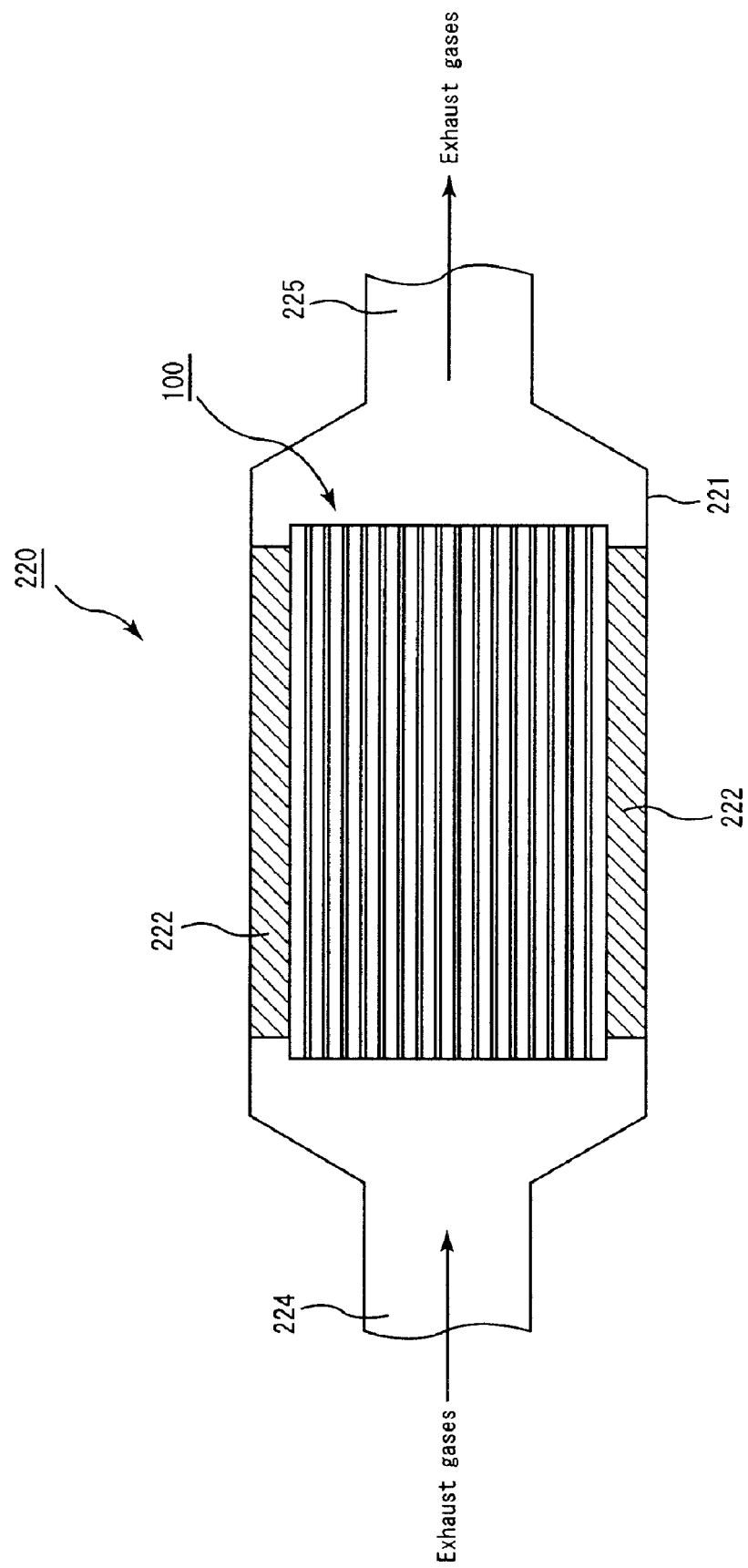
FIG. 4 is a cross-sectional view of a exhaust gas purifying apparatus.

As shown in FIG. 4, a honeycomb structure was placed in an exhaust gas passage of an engine to form an exhaust gas purifying apparatus, and the honeycomb structure was allowed to capture PM.

An exhaust gas purifying apparatus 220 was mainly formed by a honeycomb structure 100, a casing 221 that covers the outside of the honeycomb structure 100 and a holding sealing material 222 placed between the honeycomb structure 100 and the casing 221, and an introducing pipe 224, which was coupled to an internal combustion engine such as an engine, was connected to the end portion of the casing 221 on the side from which exhaust gases were introduced, and an exhaust pipe 225 coupled to the outside was connected to the other end portion of the casing 221. Here, in FIG. 4, arrows show flows of exhaust gases.

The engine was driven at the number of revolutions of 3000 $min^{-1}$ and a torque of 50 Nm for a predetermined period of time, so that 8 g of PM per 1 liter of volume of the honeycomb structure was captured. Thereafter, the engine was driven at full load at the number of revolutions of 4000 $min^{-1}$, and at the time when the temperature of the honeycomb structure became constant at about 700° C., the engine was driven at the number of revolutions of 1050 $min^{-1}$ and a torque of 30 Nm, so that PM was forcefully burned.

(a) (Observation on Presence or Absence of Crack in Adhesive Layer or in Sealing Material Layer)

With respect to the adhesive layer or the sealing material layer included in each of the honeycomb structures, the presence or absence of a crack was visually observed (observed in a five-time enlarged view by using a magnifier). In Table 1, "+" indicates that no crack was observed in any part of them and "−" indicates that a crack was observed in a part of them.

(b) (Observation on Presence or Absence of Hole in Sealing Material Layer)

With respect to the sealing material layer of each of the honeycomb structures, the presence or absence of a hole was visually observed. In Table 1, "+" indicates that no hole was observed and "−" indicates that a hole was observed.

TABLE 1

| | Cavity-holding member | Cavity-holding member Young's modulus (GPa) | Cavity-holding member Heat resistance test at 700° C. | After manufacture Presence or absence of hole in sealing material layer | After regenerating treatment Presence or absence of crack in adhesive layer or sealing material layer | After regenerating treatment Presence or absence of hole in sealing material layer |
|---|---|---|---|---|---|---|
| Example 1 | A | 0.001 | + | + | + | + |
| Example 2 | A | 0.005 | + | + | + | + |
| Example 3 | A | 0.010 | + | + | + | + |
| Example 4 | A | 0.050 | + | + | + | + |
| Example 5 | A | 0.070 | + | + | + | + |
| Example 6 | B | 0.005 | + | + | + | + |
| Example 7 | C | 0.002 | + | + | + | + |
| Comparative Example 1 | D | 0.010 | − | − | − | − |
| Comparative Example 2 | E | 0.080 | + | + | − | + |
| Comparative Example 3 | E | 1.200 | + | + | − | + |
| Comparative Example 4 | E | 0.500 | + | + | − | + |

As clearly indicated by the results shown in Table 1, in each of the honeycomb structures manufactured using the cavity-holding members of Examples 1 to 7, a crack did not occur after the regenerating treatment, and further, a hole was not formed in the sealing material layer after the manufacture of the honeycomb structure and the regenerating treatment.

In contrast, in the honeycomb structure manufactured using a cardboard as the cavity-holding member as shown in Comparative Example 1, heat resistance of the cavity-holding member was low and a hole was formed in the sealing material layer after the manufacture of the honeycomb structure and the regenerating treatment. Further, a crack occurred in the adhesive layer or in the sealing material layer after the regenerating treatment.

Here, the position where the cavity-holding member was placed and the presence or absence of a hole in the sealing material layer will be described in detail.

Figure 5A:
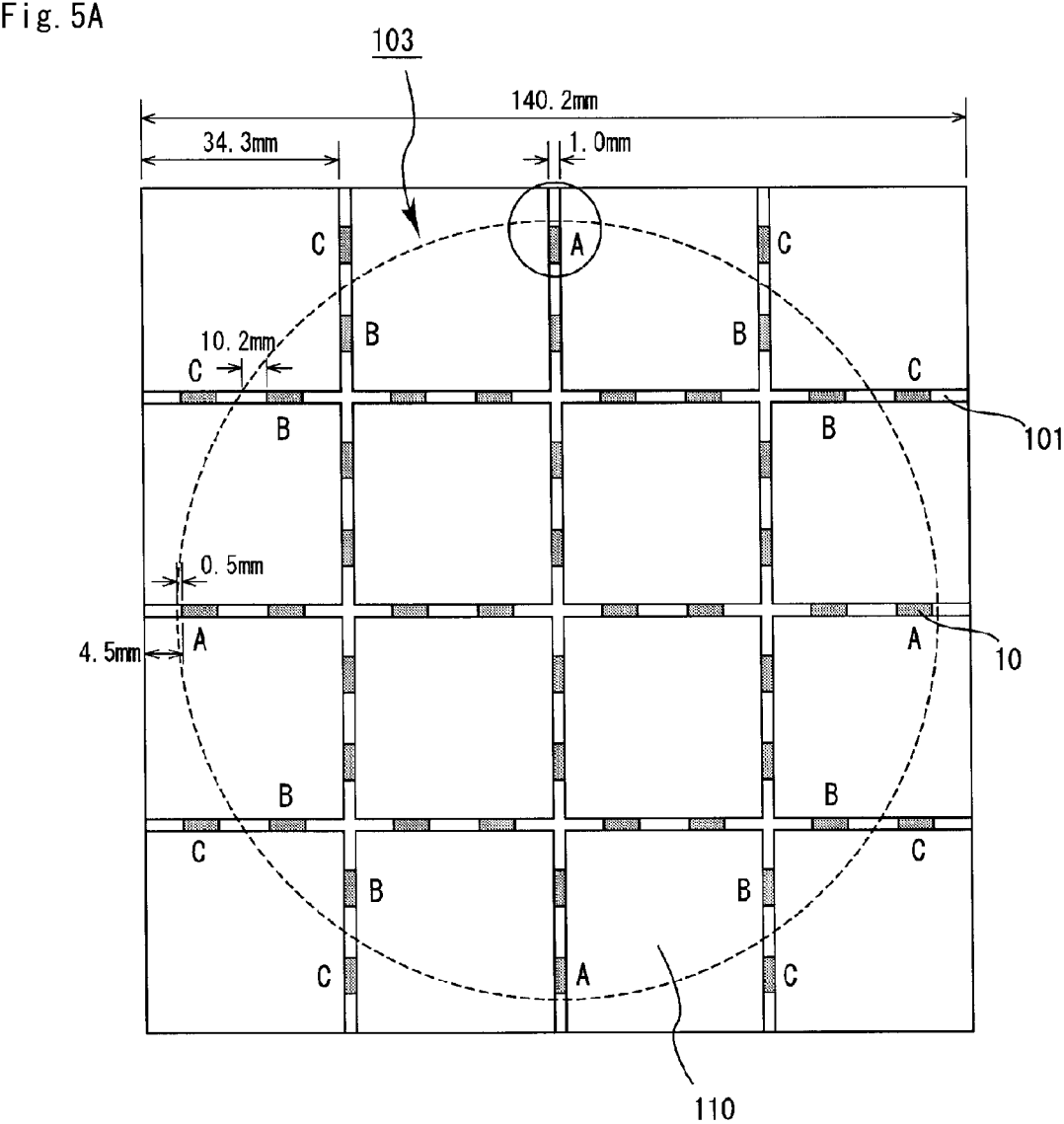
FIG. 5A is a cross-sectional view schematically showing a positional relation among the honeycomb fired body, the cavity-holding member and the ground peripheral face in the present embodiment.

FIG. 5A is a cross-sectional view schematically showing a positional relation among the honeycomb fired body, the cavity-holding member and a ground peripheral face in the present Examples and the like.

Figure 5B:
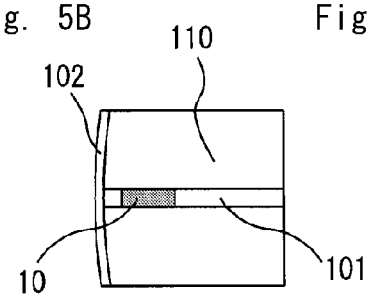
FIGS. 5B to 5D are enlarged views of neighborhood of the ground peripheral face in FIG. 5A.
Figure 5C:
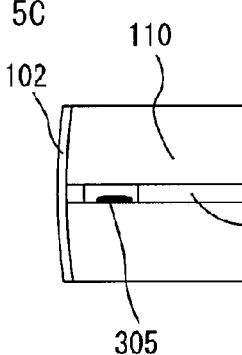
Figure 5D:
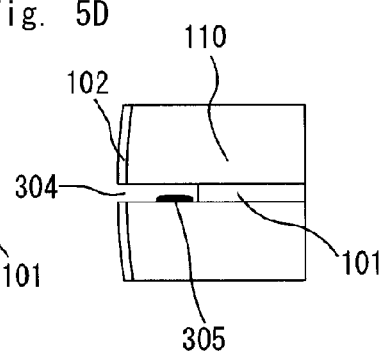

FIGS. 5B to 5D are enlarged views of neighborhood of the ground peripheral face in FIG. 5A. Here, the sealing material layer formed on the peripheral face is also shown in each of FIGS. 5B to 5D.

In the present Examples and the like, as shown in FIG. 5A, rectangular pillar-shaped honeycomb fired bodies 110 each having a size of 34.3 mm×34.3 mm were combined into a block including 4 pcs×4 pcs of the honeycomb fired bodies 110 with a sealing material layer 101 having a thickness of 1.0 mm therebetween, and thereafter, a periphery of the block was processed to form a ceramic block 103 having a diameter of 132.1 mm. A circle indicated by a dashed line in FIG. 5A is the ground peripheral face.

A total of 96 of the cavity-holding members 10 were placed on each corner of the respective honeycomb fired bodies 110.

Further, a sealing material layer having a thickness of 0.2 mm was formed on the peripheral portion of the ceramic block 103 to form a round pillar-shaped honeycomb structure having a size of 132.5 mm in diameter×150 mm in length.

In FIG. 5A, each of the cavity-holding members in position A is placed at 4.5 mm from the side face of the honeycomb fired body 110. The cavity-holding member in this position is to be placed at 0.5 mm from the ground peripheral face, and a possibility that a hole is formed in the sealing material layer becomes highest here.

Each of the cavity-holding members 10 in position B is placed at 10.2 mm from the ground peripheral face, and presumably, there is hardly the possibility that a hole is formed in the sealing material layer.

Each of the cavity-holding members 10 in position C is ground by periphery grinding and not to be left in the ceramic block 103.

In the neighborhood (circle in a solid line in FIG. 5A) of the cavity-holding members 10 in the position A, in Examples 1 to 6, there were the cavity-holding members 10 after the manufacture of the honeycomb structure, and further, there were the cavity-holding members 10 after the regenerating treatment as shown in FIG. 5B. In contrast, in Comparative Example 1, the cavity-holding members were incinerated, so that ash 305 was left, and a space was formed in the position of the cavity-holding member as shown in FIG. 5C. Further, it was observed that a hole 304 was formed in the sealing material layer 102 after the regenerating treatment as shown in FIG. 5D.

With respect to each of Examples and Comparative Example 1, a formation rate of a hole after the regenerating treatment was compared, and was 0% in Examples 1 to 6 and 25% in Comparative Example 1.

Here, eight observation sites (position A in FIG. 5A on both ends of the honeycomb structure) with respect to one honeycomb structure were observed. A total of 96 observation sites were observed with respect to 12 honeycomb structures.

Further, in the honeycomb structure manufactured using the cavity-holding member having Young's modulus of 0.08 GPa or more as shown in Comparative Examples 2 to 4, a crack occurred in the adhesive layer or in the sealing material layer after the regenerating treatment.

Second Embodiment

The following will discuss a second embodiment, which is one embodiment of the present invention.

In the present embodiment, a honeycomb structure having a catalyst supported thereon is manufactured by supporting a catalyst on the honeycomb structure manufactured in the first embodiment.

A method for supporting a catalyst is not particularly limited, and examples thereof include a method in which a catalyst supporting layer including alumina is formed and a platinum catalyst is supported thereon, and the like.

More specifically, the following processes (a) and (b) are carried out.

(a) The honeycomb structure is immersed in an alumina solution containing alumina particles; thus, the alumina particles are adhered to a cell wall of the honeycomb structure. Subsequently, the honeycomb structure is lifted out of the alumina solution, and then, the honeycomb structure is dried at a temperature of at least about 110° C. and at most about 200° C. for about two hours, and the dried honeycomb structure is fired at a temperature of at least about 500° C. and at most about 1000° C., so that the catalyst supporting layer is formed on a surface or inside of the cell wall of the honeycomb structure.

(b) Next, the honeycomb structure is immersed into a catalyst solution containing platinum.

Subsequently, the honeycomb structure is lifted out of the catalyst solution and dried, and then, the dried honeycomb structure is fired at a temperature of at least about 500° C. and at most about 800° C. under inert atmosphere, so that the catalyst is supported on the catalyst supporting layer.

In the present embodiment, the effects (1) to (11) described in the first embodiment can be exerted and the following effect can be exerted in addition.

(12) In the honeycomb structure manufactured in the first embodiment, there is no hole formed in the sealing material layer. Therefore, when the honeycomb structure is immersed in the catalyst solution in the present embodiment, the catalyst solution is not leaked from a hole and the honeycomb structure having a catalyst uniformly supported thereon can be manufactured.

Third Embodiment

The following will discuss a third embodiment, which is one embodiment of the present invention.

In the present embodiment, a plurality of kinds of the honeycomb fired bodies is manufactured and the plurality of kinds of the honeycomb fired bodies is bonded to form a ceramic block, thereby manufacturing a honeycomb structure.

The shape of the honeycomb structure manufactured in the present embodiment is not particularly limited. In a case where a round pillar-shaped honeycomb structure is manufactured, examples of a manufacturing method thereof include the following method: placing four rectangular pillar-shaped honeycomb fired bodies in a center first; placing eight honeycomb fired bodies so as to surround the honeycomb fired bodies in the center, each of the surrounding honeycomb fired bodies having a shape surrounded by three straight lines and one curved line on a cross section perpendicular to the longitudinal direction thereof; and placing four honeycomb fired bodies adjacently to the surrounding honeycomb fired bodies, each of the adjacent honeycomb fired bodies having a shape surrounded by two straight lines and one curved line on a cross section perpendicular to the longitudinal direction thereof.

In the present embodiment, the effects (1) to (11) described in the first embodiment can be exerted and the following effect can be exerted in addition.

(13) Since the periphery of the ceramic block is not required to be ground, manufacturing can be simplified. Further, a waste of material caused by grinding can be avoided.

Other Embodiments

A material of the cavity-holding member is not particularly limited so long as the obtained cavity-holding member is nonflammable as a whole and Young's modulus thereof is in a range of at least about 0.001 GPa and at most about 0.07 GPa.

The position of the cavity-holding member on the side face of the honeycomb fired body is not particularly limited, however, it is desirable to place each of the cavity-holding members at equal intervals from each other so as to make the unevenness in thickness of the adhesive layer smaller.

Further, the number of the cavity-holding members placed on one side face of the honeycomb fired body is not particularly limited.

The method for forming the adhesive paste layer is not particularly limited to the method described in the first embodiment, and examples thereof may include a method in which the adhesive paste is filled between the respective honeycomb fired bodies in a state where the respective honeycomb fired bodies are temporarily fixed to a frame which has the virtually same shape as that of the ceramic block to be manufactured.

In this case, it is desirable to temporarily fix the cavity-holding members on the side face of the honeycomb fired body by pasting or the like.

End portions of the cell of the honeycomb fired body are not required to be sealed. A honeycomb structure having cells not sealed of an embodiment of the present invention can be used as a catalyst supporting carrier by supporting a catalyst thereon.

The shape of the honeycomb structure of the embodiments of the present invention is not particularly limited to the round pillar shape shown in FIG. 1, and the honeycomb structure may have any desired pillar shape such as a cylindroid shape and a rectangular pillar shape.

A porosity of the honeycomb structure of the embodiments of the present invention is desirably at least about 30% and at most about 70%.

This structure tends to make it possible to maintain sufficient strength in the honeycomb structure and to maintain a low level resistance at the time of passage of exhaust gases through the cell walls.

In contrast, the porosity of about 30% or more tends not to cause clogging in the cell walls in an early stage, while the porosity of about 70% or less tends not to cause a decrease in strength of the honeycomb structure with the result that the honeycomb structure tends not to be easily broken.

Here, the porosity can be measured through conventionally known methods such as a mercury injection method, an Archimedes method and a measuring method using a scanning electronic microscope (SEM).

A cell density on a cross section perpendicular to the longitudinal direction of the honeycomb structure of the embodiments of the present invention is not particularly limited. However, a desirable lower limit is about 31.0 pcs/cm$^2$ (about 200 pcs/in$^2$) and a desirable upper limit is about 93 pcs/cm$^2$ (about 600 pcs/in$^2$). A more desirable lower limit is about 38.8 pcs/cm$^2$ (about 250 pcs/in$^2$) and a more desirable upper limit is about 77.5 pcs/cm$^2$ (about 500 pcs/in$^2$).

Further, a thickness of the cell walls of the honeycomb structure of the embodiments of the present invention is not particularly limited; however, the thickness thereof is desirably at least about 0.1 mm and at most about 0.4 mm.

The main component of constituent materials of the honeycomb structure of the embodiments of the present invention is not limited to silicon carbide. Examples of other ceramic materials may include: a nitride ceramic such as aluminum nitride, silicon nitride, boron nitride and titanium nitride; a carbide ceramic such as zirconium carbide, titanium carbide, tantalum carbide and tungsten carbide; a complex of a metal and a nitride ceramic; a complex of a metal and a carbide ceramic; and the like.

Moreover, a silicon-containing ceramic prepared by blending a metal silicon into the above-mentioned ceramic and a ceramic material such as a ceramic bonded by silicon or a silicate compound may also be used as the constituent materials.

As the main component of the constituent materials of the honeycomb structure of the embodiments of the present invention, silicon carbide is particularly desirable.

Silicon carbide is superior in heat resistance, mechanical strength, thermal conductivity and the like.

Further, a material prepared by blending a metal silicon into silicon carbide (silicon-containing silicon carbide) is also preferable.

Although the particle diameter of silicon carbide powder in the wet mixture is not particularly limited, the silicon carbide powder that tends not to cause the case where the size of the honeycomb fired body manufactured by the following firing treatment becomes smaller than that of the honeycomb molded body after degreased is desirable. For example, silicon carbide powder prepared by combining 100 parts by weight of powder having an average particle diameter of at least about 1.0 μm and at most about 50 μm with at least about 5 parts by weight and at most about 65 parts by weight of powder having an average particle diameter of at least about 0.1 μm and at most about 1.0 μm, is preferably used.

The organic binder in the wet mixture is not particularly limited, and examples thereof include carboxymethyl cellulose, hydroxyethyl cellulose, polyethylene glycol, and the like. Out of these, methylcellulose is desirably used. In general, the blending amount of the organic binder is desirably at least about 1 part by weight and at most about 10 parts by weight with respect to 100 parts by weight of the ceramic powder.

A plasticizer and a lubricant to be used upon preparing the wet mixture are not particularly limited, and for example, glycerin or the like may be used as the plasticizer. Moreover, as the lubricant, for example, polyoxy alkylene-based compounds, such as polyoxyethylene alkyl ether, polyoxypropylene alkyl ether and the like may be used.

Specific examples of the lubricant include, for example, polyoxyethylene monobutyl ether, polyoxypropylene monobutyl ether, and the like.

Here, the plasticizer and the lubricant are not necessarily contained in the wet mixture depending on cases.

Upon preparing the wet mixture, a dispersant solution may be used, and examples thereof include water, an organic solvent such as benzene, alcohol such as methanol, and the like.

Moreover, a molding auxiliary may be added to the wet mixture.

The forming auxiliary is not particularly limited, and examples thereof include ethylene glycol, dextrin, fatty acid, fatty acid soap, polyalcohol, and the like.

Furthermore, a pore-forming agent such as balloons that are fine hollow spheres including an oxide-based ceramic, spherical acrylic particles, graphite and the like may be added to the wet mixture, if necessary.

With respect to the balloons, not particularly limited, for example, alumina balloons, glass micro-balloons, shirasu balloons, fly ash balloons (FA balloons), mullite balloons and the like may be used. Out of these, alumina balloons are more desirably used.

Although a plug material paste used for sealing cells is not particularly limited, the plug material paste that allows the plugs manufactured through post processes to have a porosity of at least about 30% and at most about 75% is desirably used. For example, the same material as that of the wet mixture may be used.

Examples of the inorganic binder in the sealing material paste include silica sol, alumina sol and the like. Each of these may be used alone or two or more kinds of these may be used in combination. Silica sol is more desirably used among the inorganic binders.

Examples of the organic binder in the sealing material paste include polyvinyl alcohol, methyl cellulose, ethyl cellulose, carboxymethyl cellulose and the like. Each of these may be used alone or two or more kinds of these may be used in combination. Carboxymethyl cellulose is more desirably used among the organic binders.

Examples of the inorganic fibers in the sealing material paste include ceramic fibers such as silica-alumina fibers, mullite fibers, alumina fibers and silica fibers, and the like. Each of these may be used alone or two or more kinds of these may be used in combination. Alumina fibers are more desirably used among the inorganic fibers.

Examples of the inorganic particles in the sealing material paste include carbides, nitrides, and the like, and specific examples thereof include inorganic powder made from silicon carbide, silicon nitride, boron nitride and the like. Each of these may be used alone, or two or more kinds of these may be used in combination. Out of the inorganic particles, silicon carbide is desirably used due to its superior thermal conductivity.

Furthermore, a pore-forming agent such as balloons that are fine hollow spheres including an oxide-based ceramic, spherical acrylic particles, graphite and the like may be added to the sealing material paste, if necessary. The balloons are not particularly limited, and for example, alumina balloons, glass micro-balloons, shirasu balloons, fly ash balloons (FA balloons), mullite balloons, and the like may be used. Out of these, alumina balloons are more desirably used.

With respect to the catalyst to be supported on the honeycomb structure of the embodiments of the present invention, for example, a noble metal such as platinum, palladium and rhodium is desirably used. Out of these, platinum is more preferably used. Moreover, with respect to other catalysts, alkali metals such as potassium and sodium, or alkali-earth metals such as barium can be also used. Each of these catalysts may be used alone, or two or more kinds of these may be used in combination.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method for manufacturing a honeycomb structure, the method comprising:
   molding a ceramic raw material to manufacture a honeycomb molded body having a plurality of cells longitudinally disposed substantially in parallel with one another with a cell wall between the cells;

firing said honeycomb molded body to manufacture a honeycomb fired body; and bonding a plurality of said honeycomb fired bodies to manufacture a ceramic block by placing a cavity-holding member between side faces of said honeycomb fired bodies, forming an adhesive paste layer, and then, solidifying the adhesive paste layer by heating, wherein said cavity-holding member has a substantially rectangular pillar shape and has a substantially same thickness as a thickness of the adhesive paste layer, wherein said cavity-holding member comprises a nonflammable material which is nonflammable at a temperature of about 700° C., the nonflammable material comprising a fibrous paper or an inorganic material sheet each comprising fibers and inorganic particles, wherein the cavity-holding member has Young's modulus of at least about 0.001 GPa and at most about 0.02 GPa, wherein the cavity-holding member has a density of at least about 0.8 g/cm$^3$ and at most about 2.0 g/cm$^3$, wherein the material of the cavity-holding member is a different material from that of the adhesive paste layer, wherein said fibers contained in the cavity-holding member are selected from a group consisting of zirconia fibers, calcium silicate fibers, magnesium silicate fibers, rock wool, and wherein the adhesive paste layer includes inorganic fibers selected from a group consisting of silica-alumina fibers, mullite fibers, alumina fibers and silica fibers.

2. The method for manufacturing a honeycomb structure according to claim 1, wherein said inorganic particles contained in the cavity-holding member are selected from the group consisting of silica, titania, alumina, zirconia, spinel, magnesia, aluminum hydroxide, calcium carbonate, talc, calcium silicate, magnesium silicate, perlite, vermiculite and diatomite.

3. The method for manufacturing a honeycomb structure according to claim 1, the method further comprising:

grinding a periphery of said ceramic block; and forming a sealing material layer on a peripheral face of said ceramic block having the ground periphery.

4. The method for manufacturing a honeycomb structure according to claim 1, wherein the ceramic block is manufactured by manufacturing a plurality of kinds of honeycomb fired bodies and bonding said plurality of kinds of honeycomb fired bodies.

5. The method for manufacturing a honeycomb structure according to claim 1, the method further comprising, sealing either one end of each of said cells.

6. The method for manufacturing a honeycomb structure according to claim 1, the method further comprising, immersing said honeycomb structure in a solution containing a catalyst to support the catalyst on said cell wall.

7. The method for manufacturing a honeycomb structure according to claim 1, wherein the cavity-holding member comprises a material which is nonflammable at a temperature of about 1000° C.

8. The method for manufacturing a honeycomb structure according to claim 1, wherein the cavity-holding member further comprises at least one of inorganic particles including at least one of MgO, CaO and feldspar; an organic material including at least one of a wood pulp and an organic binder; and an inorganic filler including a material other than said inorganic particles.

9. The method for manufacturing a honeycomb structure according to claim 4, wherein said plurality of kinds of honeycomb fired bodies comprises:

a honeycomb fired body having a substantially rectangular shape;

a honeycomb fired body having a shape surrounded by three straight lines and one curved line on a cross section perpendicular to the longitudinal direction thereof; and a honeycomb fired body having a shape surrounded by two straight lines and one curved line on a cross section perpendicular to the longitudinal direction thereof.

10. The method for manufacturing a honeycomb structure according to claim 1, wherein a main component of the honeycomb fired body comprises silicon carbide or silicon-containing silicon carbide.

11. The method for manufacturing a honeycomb structure according to claim 1, wherein in said bonding, a load is applied to the cavity-holding member to reduce a thickness of the cavity-holding member by at least about 20% and at most about 50%.

12. The method for manufacturing a honeycomb structure according to claim 11, wherein the load is about 5 MPa in a direction of thickness of the cavity-holding member.

13. The method for manufacturing a honeycomb structure according to claim 1, wherein said bonding comprises, placing the honeycomb fired body on a stage having a V shape in cross section along the V shape;

forming an adhesive paste layer on two upper side faces of the honeycomb fired body;

placing the cavity-holding member on the adhesive paste layer; and repeating placing another honeycomb fired body on the cavity-holding member.

14. The method for manufacturing a honeycomb structure according to claim 1, wherein said bonding comprises, temporarily fixing the respective honeycomb fired bodies to a frame which has the virtually same shape as a shape of the ceramic block; and filling the adhesive paste between the respective honeycomb fired bodies.

15. The method for manufacturing a honeycomb structure according to claim 1, wherein the material which is nonflammable has a weight change rate of less than 80% at 700° C. for 1 hour.

16. The method for manufacturing a honeycomb structure according to claim 7, wherein the material which is nonflammable has a weight change rate of less than 80% at 1000° C. for 1 hour.

17. The method for manufacturing a honeycomb structure according to claim 1, wherein, in said bonding, said honeycomb fired body is placed on a stage having a V shape in cross section along the V shape, and an adhesive paste is applied to two upper side faces of said honeycomb fired body to form said adhesive paste layer.

18. The method for manufacturing a honeycomb structure according to claim 1, wherein said adhesive paste layer further includes an inorganic binder that is selected from the group consisting of silica sol and alumina sol.

19. The method for manufacturing a honeycomb structure according to claim 1, wherein said adhesive paste layer further includes an organic binder that is selected from the group consisting of polyvinyl alcohol, methyl cellulose, ethyl cellulose and carboxymethyl cellulose.

20. The method for manufacturing a honeycomb structure according to claim 1, wherein said fibrous paper or said inorganic material sheet is a material processed into a sheet shape.

21. The method for manufacturing a honeycomb structure according to claim 1, wherein the adhesive paste layer further includes an inorganic binder and an organic binder.

22. A method for manufacturing a honeycomb structure, the method comprising:

molding a ceramic raw material to manufacture a honeycomb molded body having a plurality of cells longitudinally disposed substantially in parallel with one another with a cell wall between the cells;

firing said honeycomb molded body to manufacture a honeycomb fired body; and bonding a plurality of said honeycomb fired bodies to manufacture a ceramic block by placing a cavity-holding member between side faces of said honeycomb fired bodies, forming an adhesive paste layer, and then, solidifying the adhesive paste layer by heating, wherein said cavity-holding member has a substantially rectangular pillar shape and has a substantially same thickness as a thickness of the adhesive paste layer, wherein said cavity-holding member comprises a nonflammable material which is nonflammable at a temperature of about 700° C., the nonflammable material comprising a fibrous paper or an inorganic material sheet each comprising fibers and inorganic particles, wherein the cavity-holding member has Young's modulus of at least about 0.001 GPa and at most about 0.02 GPa, wherein the cavity-holding member has a density of at least about 0.8 $g/cm^3$ and at most about 2.0 $g/cm^3$, wherein the material of the cavity-holding member is a different material from that of the adhesive paste layer, wherein said fibers contained in the cavity-holding member are selected from a group consisting of alumina fibers, zirconia fibers, alumina-silica fibers, silica fibers, glass fibers, calcium silicate fibers, magnesium silicate fibers, rock wool, glass wool, and wherein the adhesive paste layer includes inorganic fibers selected from a group consisting of mullite fibers.

* * * * *